United States Patent [19]

Hirth et al.

[11] Patent Number: 4,559,147

[45] Date of Patent: Dec. 17, 1985

[54] OPTICAL IMMERSION OIL

[75] Inventors: Georges Hirth, Huningue, France; Martin Petrzilka, Kaiseraugst; Inge Pracht, Riehen, both of Switzerland

[73] Assignee: Hoffmann-La Roche Inc., Nutley, N.J.

[21] Appl. No.: 556,677

[22] Filed: Nov. 30, 1983

[30] Foreign Application Priority Data

Dec. 14, 1982 [CH] Switzerland ................. 7259/82

[51] Int. Cl.$^4$ ................. C09K 3/00; C10M 1/00
[52] U.S. Cl. ................. 252/1; 252/408.1; 252/9; 252/582; 350/418
[58] Field of Search ............ 252/1, 408.1, 582, 9; 350/418

[56] References Cited

U.S. PATENT DOCUMENTS

| 3,497,562 | 2/1970 | Levins | 350/418 X |
| 3,929,667 | 12/1975 | Bautis | 252/408.1 |
| 3,933,678 | 1/1976 | Graham | 350/418 X |
| 3,979,301 | 9/1976 | Ushioda | 350/418 X |
| 4,043,638 | 8/1977 | Kaufmann | 350/418 X |
| 4,108,794 | 8/1978 | Yonekubo | 252/408.1 |
| 4,493,533 | 1/1985 | Petrzilka et al. | 252/408.1 X |

FOREIGN PATENT DOCUMENTS

| 920 of 1866 | United Kingdom | 350/418 |
| 101260 | 8/1916 | United Kingdom | 350/418 |
| 2097395 | 11/1982 | United Kingdom | 252/408.1 |

OTHER PUBLICATIONS

Gigg, et al, "Preparation of Unsymmetrical Diglycerides", J. Chem. Soc. (c) 1967, pp. 431-434.
Sergeyev, et al, "A Synthetic Immersion Oil . . . ", Opt.-Mekh. Prom. 34(7), 48-53, 1967.
Cunningham, Jill and Gigg, Roy, "Glycerol 1, 2-Carbonate," National Institute for Medical Research, J. Chem. Soc. pp. 1553-1554, (1965).
Chemical Abstracts 67, 118418d (1967).

*Primary Examiner*—Teddy S. Gron
*Assistant Examiner*—Catherine S. Kilby
*Attorney, Agent, or Firm*—Jon S. Saxe; Bernard S. Leon; George W. Johnston

[57] ABSTRACT

There are described an immersion oil containing one or more compounds of the formula

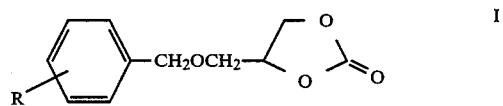

wherein R is hydrogen or methyl, and its use in optics, especially fluorescence microscopy.

9 Claims, No Drawings

OPTICAL IMMERSION OIL

FIELD OF THE INVENTION

The present invention is concerned with the use of glycerol 1,2-carbonates for immersion oils as well as a novel immersion oil and its use in optics, especially in fluorescence microscopy.

BACKGROUND OF THE INVENTION

The term "immersion oil" is a familiar technical term in microscopy and does not signify oils in the ordinary sense, but embraces general immersion media which are suitable for immersion optics.

Oil immersion optics are very common in modern microscopy and in allied fields, since they permit a higher resolution and light intensity as well as a substantially less spherical aberration than dry optics or water immersion optics. The immersion oil, which completely fills the space between objective and cover glass or preparation to be investigated, forms a part of the optical system and therefore must be adapted to this as precisely as possible. The refractive index $n_D$ of the immersion oil should be adapted at least to the glass of the objective front lens, i.e. it should be about 1.500–1.525 at 23° C. According to agreement of microscope manufacturers and corresponding regulations of the German Institute for Standards, an immersion oil should fulfil the following requirements with respect to the refractive indices $n_D$ and $n_e$ and the dispersion $\nu_e$: $n_D$ (23° C.)=1.515, $n_e$ (23° C.)=1.518±0.0004 and $\nu_e$=44±5. Further, the immersion oil should have good UV-transmissivity, should be as fluorescence-free as possible and should not attack glass, synthetic object carriers, lens cement and most of the samples to be investigated. Moreover, the immersion oil should be colourless, should be as odourless as possible, should not be hydroscopic, should have a viscosity which permits an easy handling, should have no harmful effect on the user and should exhibit a constant composition, i.e. in particular no optical change should occur by the influence of light, air, temperature and the like.

The hitherto known immersion oils consist for the most part of mixtures of mineral oils, paraffin oils and/or polyisobutylenes with compounds having a high refractive index such as, for example, polychlorinated biphenyls or hydrogenated terphenyls (U.S. Pat. No. 3,929,667). Further, an immersion oil based on thioethers is known from European Patent Application Publication Number 63684. Polychlorinated biphenyls, however, attack synthetic materials (e.g. synthetic object carriers). Further, they are known to be toxic and environmentally dangerous and are therefore only used when it is absolutely necessary because of their favourable fluorescence properties. On the other hand, the remaining previously known immersion oils have other disadvantages, for example they have a moderate to slight, but still troublesome, fluorescence in UV-light and a relatively poor transmissivity, they form streaks or they dissolve the lens cement.

DESCRIPTION OF THE INVENTION

It has now been found that glycerol 1,2-carbonates of the formula

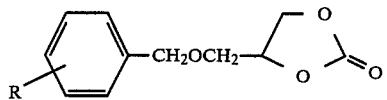

wherein R is hydrogen or methyl, are especially well suited for use as immersion oils.

The compounds of formula I are known or are analogues of known compounds and can be prepared according to known methods [J. Chem. Soc. 1553 (1965)]. R in formula I preferably is hydrogen.

In pure form the compounds of formula I have almost optimum refractive indices and dispersion values. For example, for 3-O-benzylglycerol 1,2-carbonate (the compound of formula I in which R signifies hydrogen) $n_D$ (23° C.)=1.518 and $\nu_e$=41. Further, it has been found in particular that the compounds of formula I have very good UV-transmissivity, are practically fluorescence-free (UV to blue excitation), are not corrosive towards glass, synthetic materials, lens cement or to the samples which are most frequently investigated, are odourless and are not environmentally dangerous.

The invention is also concerned with an immersion oil having at least two components, wherein at least one component is a compound of formula I.

The refractive index $n_D$ of the immersion oil provided by the invention at 23° C. is conveniently about 1.500–1.525 and preferably about 1.515.

The immersion oil provided by the invention can consist of two or more compounds of formula I. In general, however, it consists of one or more compounds of formula I and one or more additional components for optimizing the refractive index, the viscosity and the like. In this case it must, however, be observed that these additional components must have good miscibility with the compounds of formula I and that, apart from the refractive index, they should also satisfy the above requirements as far as possible. In particular, they should be as fluorescence-free as possible and should have good UV-transmissivity. Such additives are in principle known to the person skilled in the art. Examples of suitable additives are 2-(hydroxymethyl)thiophene, lycopane, isophytol, 1,2,3-trimethoxypropane, 1,3-dimethoxy-2-propanol, phytyl methyl ether and especially aliphatic glycols and glycol ethers (e.g. polyethylene glycol, tetraethylene glycol dimethyl ether and the like). Preferred additives are polyethylene glycols which, depending on the desired viscosity and desired temperature range, can have different degrees of polymerization. Polyethylene glycols having an average molecular weight ("average molecular weight" as is indicated by the manufacturers) of about 200 (hydroxyl number 535–590) to about 4000 (hydroxyl number 25–32), especially about 1000 (hydroxyl number 107–118), have been found to be especially suitable for most applications.

The amount of compounds of formula I in the immersion oil provided by the invention can vary in a wide range depending on the substituent R, the type of additional components, the desired refractive index and the like. On the basis of the almost optimum properties of the compounds of formula I, the amount of such compounds is, however, generally chosen as high as possible. The immersion oils provided by the invention therefore preferably contain at least about 80 weight % and particularly preferably about 90–98 weight % of compounds of formula I.

There is especially preferred an immersion oil which consists of 3-O-benzylglycerol 1,2-carbonate (about 90–95 weight %) and polyethylene glycol (remainder), preferably a polyethylene glycol having an average molecular weight of about 1000.

The manufacture of the immersion oils provided by the invention and the optimization of the refractive index can be carried out in a manner known per se; for example, by mixing the approximate amounts of the components at an elevated temperature, cooling, measuring the refractive index and, if necessary, adding the appropriate component (or components) until the desired refractive index is attained.

The immersion oils provided by the invention have the requisite properties and, in particular, are not encumbered with the disadvantages of the previously known immersion oils. Since they are water-insoluble, the danger that colouring substance is dissolved out from non-covered, coloured microscopic sections or smear preparations (e.g. blood smears) or an insufficiently fixed object's wash away is largely avoided. On the other hand, the immersion oils provided by the invention are soluble in the majority of customary organic solvents (e.g. chloroform, methylene chloride, diethyl ether, ethanol, benzene, toluene, xylene, petroleum ether) and this substantially facilitates the cleaning of the objective and the object carrier.

The immersion oils provided by the invention can be used in various fields of optics. For example, on the basis of their high transmissivity they can be used in place of immersion glycerine and in absorption photometry. Furthermore, they can be used as an optical standard substance, as a liquid carrier medium, as an optical coupling medium (glass fibre optics), as a transparent investigation fluid (e.g. for testing contact lenses or in the electronics industry) and the like. However, the preferred field of use is microscopy and especially fluorescence microscopy.

The aforementioned freedom from fluorescence means in the scope of the present invention that the fluorescence of the immersion oil in a horizontal quartz cuvette of 0.2 mm layer thickness in the quantitative measurement in a fluorescence microscope is not significantly different from that of water. Depending on the nature of the additive and purity of the components the immersion oils provided by the invention exhibit no fluorescence or a very slight fluorescence.

The present invention is illustrated further by the following Examples. The individual fluorescence was measured in quartz cuvettes of 0.2 mm layer thickness with a ZEISS microscope fluorometer for the three excitations UV, violet and blue. The relative fluorescence was ascertained by comparison with water (0%) and a standard (SF 1, thickness 5 mm; 100%) The accuracy of measurement was about 1%.

EXAMPLE 1

About 92.5 parts by weight of DL-3-O-benzylglycerol 1,2-carbonate and about 7.5 parts by weight of Carbowax ® 1000 (polyethylene glycol having an average molecular weight of about 1000; purest quality) were mixed while warming until a clear homogeneous liquid was obtained. This liquid was then cooled to 23° C. By adding small amounts of DL-3-O-benzylglycerol 1,2-carbonate or Carbowax ® 1000 the refractive index $n_D$ (23° C.) was finally adjusted exactly to 1.515.

The immersion oil obtained was colourless and odourless and had the following physical properties:

| | |
|---|---|
| Refractive index at 23° C. | $n_e$ (546.07 nm) = 1.518 |
| | $n_D$ (589.26 nm) = 1.515 |
| Temperature dependence of the refractive index | $\Delta n/\Delta T$ = 0.0004/°C. |
| Dispersion (Abbe) at 23° C. | $\nu_e$ = 39 |
| Fluorescence for UV, violet and blue excitation | 0.3%, 0.7% and 0%, respectively (not different from distilled water in the microscope) |
| Density at 23° C. | 1.21 g/ml |
| Viscosity at 23° C. | 96 mPa · s |
| Turbidity point | < −20° C. |
| Spectral transmissivity $\tau_i$ (0.2 mm layer thickness) | 50% at about 280 nm. |

EXAMPLE 2

About 96 parts by weight of DL-3-O-benzylglycerol 1,2-carbonate and about 4 parts by weight of tetraethylene glycol dimethyl ether were mixed in a manner analogous to that described in Example 1 and then the refractive index $n_D$ (23° C.) was adjusted exactly to 1.515.

The immersion oil obtained was colourless and odourless and had the following physical properties:

| | |
|---|---|
| Refractive index at 23° C. | $n_e$ (546.07 nm) = 1.518 |
| | $n_D$ (589.26 nm) = 1.515 |
| Temperature dependence of the refractive index | $\Delta n/\Delta T$ = 0.0004/°C. |
| Dispersion (Abbe) at 23° C. | $\nu_e$ = 38 |
| Fluorescence for UV, violet and blue excitation | 0.5%, 0.7% and 0%, repectively (not different from distilled water in the microscope) |
| Density at 23° C. | 1.20 g/ml |
| Viscosity at 23° C. | 61 mPa · s |
| Turbidity point | < −20° C. |
| Spectral transmissivity $\tau_i$ (0.2 mm layer thickness) | 50% at about 280 nm. |

We claim:

1. An immersion oil comprising at least two components, wherein at least one of said components is a compound of the formula:

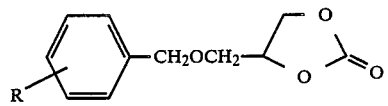

wherein R is hydrogen or methyl and the second or additional of such components is suitable for use in optical immersion oils, and is selected from the group consisting of 2-(hydroxymethyl) thiophene, lycopane, isophytol, 1,2,3-trimethoxy propane, 1,3-dimethoxy-2-propanol, phytyl methyl ether, aliphatic glycols and glycol ethers said oil having a refractive index $n_D$ of about 1.500 to about 1.525 at 23° C.

2. An immersion oil according to claim 1, which comprises 3-O-benzylglycerol 1,2-carbonate.

3. An immersion oil according to claim 1 wherein the second or an additional component is an aliphatic glycol or an aliphatic glycol ether.

4. An immersion oil according to claim 1 which comprises at least 80 weight % of one or more compounds of formula I.

5. An immersion oil according to claim 4, which comprises 90–98 weight % of one or more compounds of formula I.

6. An immersion oil according to claim 1 which comprises 3-O-benzylglycerol 1,2-carbonate and polyethylene glycol having an average molecular weight of 200–4000.

7. An immersion oil according to claim 6 which comprises polyethylene glycol having an average molecular weight of about 1000.

8. An immersion oil according to claim 1 which comprises of 3-O-benzylglycerol 1,2-carbonate and polyethylene glycol, the amount of 3-O-benzylglycerol 1,2-carbonate present being 90–95 weight %.

9. An improved optical system having an objective lens, a preparation to be optically investigated, a cover glass over the preparation, and an immersion oil filling the space between the objective lens and the cover glass or the preparation, wherein the improvement comprises the immersion oil having at least two components, with at least one of said components being a compound of the formula:

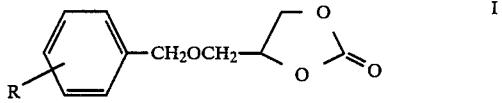

wherein R is hydrogen or methyl and the second or additional of such components is suitable for use in optical immersion oils, and is selected from the group consisting of 2-(hydroxymethyl) thiophene, lycopane, isophytol, 1,2,3-trimethoxy propane, 1,3-dimethoxy-2-propanol, phytyl methyl ether, aliphatic glycols and glycol ethers said immersion oil having a refractive index $n_D$ of about 1.500 to about 1.525 at 23° C.

* * * * *